United States Patent
McNabney et al.

(10) Patent No.: US 10,846,318 B1
(45) Date of Patent: Nov. 24, 2020

(54) NATURAL LANGUAGE VISUALIZATIONS

(71) Applicant: MicroStrategy Incorporated, Vienna, VA (US)

(72) Inventors: Chris McNabney, Reston, VA (US); Siamak Ziraknejad, Reston, VA (US); Dongping Liang, Herndon, VA (US); Jose Nocedal, Leesburg, VA (US)

(73) Assignee: MicroStrategy Incorporated, Vienna, VA (US)

(*) Notice: Subject to any disclaimer, the term of this patent is extended or adjusted under 35 U.S.C. 154(b) by 101 days.

(21) Appl. No.: 15/955,541

(22) Filed: Apr. 17, 2018

Related U.S. Application Data (60) Provisional application No. 62/486,660, filed on Apr. 18, 2017.

(51) Int. Cl.
G06F 16/00 (2019.01)
G06F 16/33 (2019.01)
G06F 16/338 (2019.01)
G06F 16/332 (2019.01)

(52) U.S. Cl.
CPC ........ G06F 16/3344 (2019.01); G06F 16/338 (2019.01); G06F 16/3325 (2019.01); G06F 16/3334 (2019.01)

(58) Field of Classification Search
CPC ......... G06F 16/337; G06F 16/34; G10L 15/22
USPC ....................................................... 707/713
See application file for complete search history.

(56) References Cited

U.S. PATENT DOCUMENTS

| | | | |
|---|---|---|---|
| 5,414,469 A | 5/1995 | Gonzales et al. | |
| 6,701,294 B1 | 3/2004 | Ball et al. | |
| 7,181,444 B2 | 2/2007 | Porter et al. | |
| 7,373,292 B1* | 5/2008 | Coyne ............... | G06F 40/20 704/9 |
| 8,402,052 B2 | 3/2013 | Sano et al. | |
| 8,495,627 B2 | 7/2013 | Barsness et al. | |
| 8,996,523 B1 | 3/2015 | Fisher | |
| 9,129,448 B2 | 9/2015 | Bekmambetov et al. | |
| 9,411,853 B1 | 8/2016 | Dovrtel et al. | |
| 10,108,676 B2* | 10/2018 | Li ..................... | G06F 16/24575 |
| 10,255,320 B1 | 4/2019 | Cappiello | |
| 2002/0032676 A1 | 3/2002 | Reiner et al. | |
| 2003/0233403 A1 | 12/2003 | Bae et al. | |
| 2004/0165780 A1 | 8/2004 | Maki et al. | |
| 2005/0050036 A1 | 3/2005 | Araki | |
| 2005/0187977 A1 | 8/2005 | Frost | |

(Continued)

*Primary Examiner* — Daniel Abebe
(74) *Attorney, Agent, or Firm* — Fish & Richardson P.C.

(57) ABSTRACT

Techniques for natural language visualizations using query formatting. In some implementations, a computing device receives data indicating a natural language query from a client device that indicates a topic of interest to a user. The computing device parses the data indicating the natural language query from the client device using a predefined delimiter. The computing device identifies one or more objects that represent each term parsed from the data indicating the natural language query. The computing device determines a visualization type based on the one or more objects to visualize a response to the natural language query provided by the mobile device. The computing device visualization data based on the visualization type, the one or more objects that represent each term parsed from the data, to a rendering component to transmit to the client device for display in response to the natural language query.

19 Claims, 5 Drawing Sheets

(56) References Cited

U.S. PATENT DOCUMENTS

| | | |
|---|---|---|
| 2006/0155687 A1 | 7/2006 | Chou |
| 2006/0155688 A1 | 7/2006 | Chou |
| 2006/0227970 A1 | 10/2006 | Nakano |
| 2007/0130131 A1 | 6/2007 | Porter et al. |
| 2007/0245383 A1* | 10/2007 | Bhide .................. G06F 16/957 725/60 |
| 2009/0058860 A1* | 3/2009 | Fong ....................... G06F 40/20 345/467 |
| 2009/0104123 A1 | 4/2009 | Yang et al. |
| 2009/0112949 A1 | 4/2009 | Ergan et al. |
| 2011/0040733 A1 | 2/2011 | Sercinoglu et al. |
| 2012/0084296 A1 | 4/2012 | Waters |
| 2012/0136649 A1 | 5/2012 | Freising et al. |
| 2012/0179714 A1 | 7/2012 | Chandhok et al. |
| 2012/0226804 A1 | 9/2012 | Raja et al. |
| 2013/0013552 A1 | 1/2013 | Eshleman et al. |
| 2013/0018903 A1 | 1/2013 | Taranov |
| 2014/0195558 A1 | 7/2014 | Murthy et al. |
| 2014/0280372 A1 | 9/2014 | Huras et al. |
| 2014/0365429 A1 | 12/2014 | Wagner et al. |
| 2015/0006518 A1* | 1/2015 | Baumgartner ......... G06F 16/248 707/723 |
| 2015/0169688 A1 | 6/2015 | Halverson et al. |
| 2015/0178052 A1 | 6/2015 | Gupta et al. |
| 2015/0193719 A1 | 7/2015 | Than et al. |
| 2015/0317362 A1 | 11/2015 | Teranishi |
| 2015/0355989 A1 | 12/2015 | Hayden et al. |
| 2016/0048584 A1 | 2/2016 | Valentin |
| 2016/0154852 A1 | 6/2016 | Chen et al. |
| 2017/0039281 A1* | 2/2017 | Venkata ................ G06F 16/248 |
| 2019/0121802 A1* | 4/2019 | Venkataraman ........ G10L 15/22 |

\* cited by examiner

NATURAL LANGUAGE VISUALIZATIONS

CROSS-REFERENCE TO RELATED APPLICATION

This application claims the benefit of U.S. Provisional Application No. 62/486,660, filed Apr. 18, 2017, and titled "Natural Language Visualizations," which is incorporated by reference.

TECHNICAL FIELD

This specification relates generally to natural language visualizations.

BACKGROUND

Query systems allow a user to input a search query into a system for requested information. Typical use of query systems include directions to a destination, meal recipes, and historical information.

SUMMARY

The subject matter of the present disclosure is related to techniques for a natural language environment to provide visualizations to a user in response to the user submitting a query. The natural language environment includes computer systems, such as a rendering component and a language component. The language component communicates with a client device to receive the query and transmits rendered data in response to analyzing the query. The language component determines a visualization type by analyzing features of the received query. Additionally, the rendering component obtains the visualization type and generates a format to display the visualization type on the client device. As a result, the rendering component transmits generated rendered data to the client device for display. For example, a user, John, may enter a phrase such as "what are the top five revenues by region?" The natural language environment can process the phrase and return visualization data to the client device illustrating the top five revenues by region on a grid map shown on a display of the client device.

In some implementations, the natural language environment may analyze the query to determine a nature of interest or an answer to the query. The natural language environment provides a visualization which best represents the nature of interest or the answer to the query. Specifically, to determine whether to provide a visualization that best represents the nature of interest or answer to the query, the computer system analyzes the words of the query to identify particular objects. The identified particular objects aid the computer system in determining the visualization type. Examples of the visualization types include a grid, a line chart, a heat map, a bar chart, a video, or a combination of the above, or other visualization types.

In one general aspect, a method is performed by one or more computers. The method includes: receiving, by the one or more computers, data indicating a natural language query from a client device that indicates a topic of interest to a user; parsing, by the one or more computers, the data indicating the natural language query from the client device using a predefined delimiter; identifying, by the one or more computers, one or more objects that represent each term parsed from the data indicating the natural language query; determining, by the one or more computers, a visualization type based on the one or more objects to visualize a response to the natural language query provided by the client device; and providing, by the one or more computers, visualization data based on the determined visualization type, the one or more objects that represent each term parsed from the data, to a rendering component to transmit to the client device for display in response to the natural language query.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, wherein receiving the data comprises: receiving, from the client device over a network, data indicating one or more terms pre-populated by the client device; and receiving, from the client device over the network, data indicating an identifier of the natural language query.

In some implementations, the method further comprises wherein parsing the data further comprises: comparing the parsed data to previously parsed data associated with one or more previously submitted search queries to determine whether the natural language query has been requested before; determining a match between the parsed data and the previously parsed data associated with a previously submitted natural language query; and in response to determining the match, selecting a previous visualization type corresponding to the previously submitted natural language query to provide to the rendering component.

In some implementations, the method further comprises wherein the object type represents an indication of a part of speech for each token in the one or more tokens.

In some implementations, the method further comprises identifying, by the one or more computers, one or more characterizations to further define each of the one or more tokens, wherein each of the one or more characterizations comprises at least one of an attribute and a metric to describe each of the one or more tokens.

In some implementations, the method further comprises wherein the transmitted visualization data comprises components of the determined visualization type that comprises at least one of a title of the visualization, x-axis values, y-axis values, an indication of a color scheme, one or more drop zone regions, and a graph type.

In some implementations, the method further comprises wherein determining the visualization type further comprises determining, by the one or more computers, one or more drop zone regions from the determined visualization type.

In some implementations, the method further comprises wherein providing the data to the rendering component instructing the rendering component to transmit the visualization data based on the visualization type comprises providing, over a network, the data to the rendering component instructing the rendering component to generate a clear command, a transitional data command, and a target visualization type command to display on the client device.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
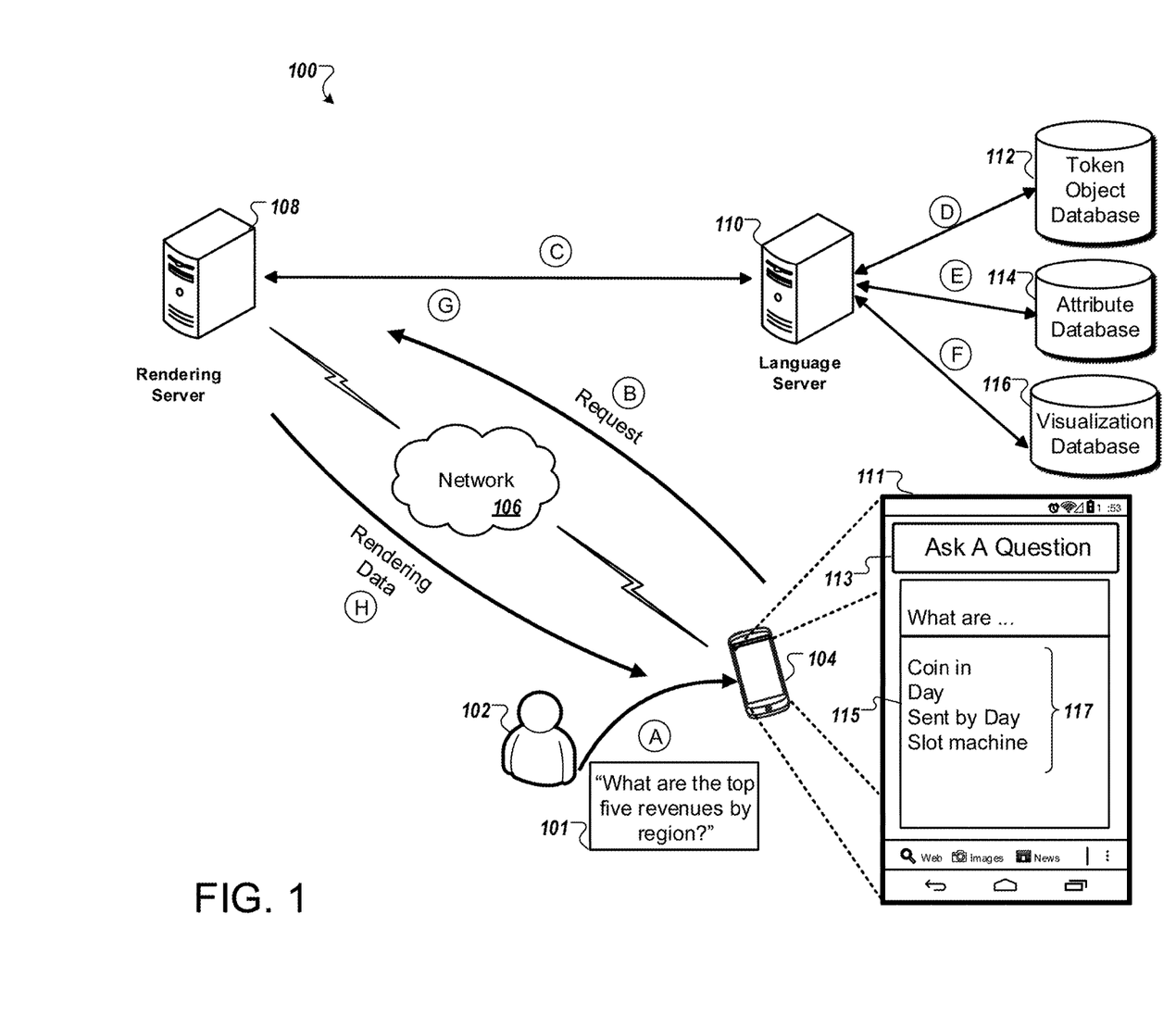
FIG. 1 is a block diagram that illustrates an example of a system for natural language visualizations.

FIG. 1 is a block diagram that illustrates an example of a system 100 for natural language visualizations. The system 100 includes a client device 104, a network 106, a rendering component 108, a language component 110, a word base 112, a dataset object library 114, a visualization library 116, and an application server 118. In some implementations, a component may be a server, a database, a flat file, or a library. FIG. 1 illustrates various operations in stages (A) to (G) which can be performed in the sequence indicated or in another sequence.

The system 100 can be used to generate a visualization in response to a query provided by a user. The query may request information regarding a particular topic of interest. The system 100 may analyze the query to determine the particular topic of interest. The particular topic of interest may seek an answer to a particular question or a response to a particular nature of interest. In response, the system 100 may determine a visualization type to respond to the particular topic of interest. To determine the particular topic of interest, the computing systems may identify words in the query and designate characteristics to the identified words. For example, the system 100 may designate parts of speech, attributes, and metrics to each of the words in the received query. In response to determining the characteristics associated with each of the words in the received query, the system 100 designates a visualization type based on the identified characteristics.

The rendering component 108 can include one or more computers, and may include computers distributed across multiple geographic locations. The rendering component 108 communicates with one or more components, such as the language component 110. In addition, the language component 110 may also include one or more computers, and may include computers distributed across multiple geographic locations. The language component 110 communicates with one or more storage devices that provide access to a word base 112, a dataset object library 114, and a visualization library 116. In some implementations, the rendering component 108 and the language component 110 may be components that are part of the same application. For example, the rendering component 108 and the language component 110 may be implemented on the same component as different components of an application. In another example, the rendering component 108 may be a component of the language component 110. In other implementations, the rendering component 108 and the language component 110 may be two separate components. The application server 118 communicates with one or more components, such as the rendering component 108. In addition, the application server 118 may also include one or more computers, and may include computers distributed across multiple geographic locations.

The client device 104 can be, for example, a desktop computer, a laptop computer, a tablet computer, a wearable computer, a cellular phone, a smart phone, a music player, an e-book reader, a navigation system, or any other appropriate computing device. The network 106 can be wired or wireless or a combination of both, and can include the Internet.

The rendering component 108 can be a part of an enterprise platform that communicates with the language component 110. Specifically, the rendering component 108 receives visualization components of a visualization type from the language component 110. In some implementations, the language component 110 receives queries from the client device 104 and parses the received query for the user input, such as user input 101, for further language processing. In other implementations, the rendering component 108 may receive queries from the client device 104, parse the received query for the user input, such as user input 101, and transmit the user input to the language component 110 for further language processing. Additionally, to facilitate in the creation of the visualization, the rendering component 108 may generate commands to instruct the client device 104 to clear an existing visualization. The rendering component 108 may perform the process of instructing the client device 104 to clear the existing visualization in order to maintain automatic screen transitions without user 102 interaction. As a result, the user may interact with client device 104 at any point in time to retrieve a new visualization based on a query input.

Additionally, the rendering component 108 may generate commands to instruct client device 104 to display transitional display data. Specifically, the transitional display data may instruct the client device 104 to transition from the existing visualization to a target visualization. The target visualization may require new display formatting and properties, such as color schemes, data types, font sizes, font styles, touch sensitivities on particular display selections, and various display permissions, to name a few examples.

In some implementations, the rendering component 108 may generate commands to instruct client device to display the target visualization. Specifically, the language component 110 may determine the target visualization in response to receiving the user input 101. In addition, the rendering component 108 may add unit values to the target visualization instructions for the client device 104. For example, in response to receiving user input 101, the language component 110 may determine the visualization type to be a grid for the received input. As a result, the language component 110 may provide the grid visualization type and unit values, such as the top five revenues for the particular area, retrieved from the visualization library 116 to the rendering component 108. The rendering component 108 may append the unit data to drop zones in the target visualization type in the commands. The rendering component 108 may then generate rendering data for these commands to send to the client device 104 to clear the existing visualization, display transitional data, and then display the target visualization with the unit data.

In addition, the language component 110 can be a part of an enterprise platform that receives the user input from the client device 104 and communicates with each of the components to process the user input and deliver a visualization type. In this example, the language component 110 communicates with the word base 112, the dataset object library 114, and the visualization library 116.

In addition, the application server 118 can be a part of an enterprise platform that requests for visualizations from the rendering component 108 following a determination of the target visualization in response to receiving the user input 101. In this example, the application server 118 communicates with the rendering component 108.

In some implementations, the word base 112 may include one or more words, phrases, symbols, or other elements called tokens. The tokens include one or more words previously identified by the language component 110 from previous user inputs. Additionally, each token is associated with one or more objects describing the token. Specifically, the object identifies a type of the token. For example, the token "five" is associated with the object "adjective" and "value". Objects indicate specific characteristics of each individual token to the language component 110 during a lexical analysis process. The objects may also indicate the tokens as being a "noun", "verb", or "pronoun", to name a few examples.

In some implementations, the same word may have multiple entries in the word base 112 with different objects. For example, the word "what" may have two entries—one entry of "what" has an object of an adjective, and a second entry of "what" has an object of an adverb. In order for the language component 110 to provide multiple entries of the word "what" in the word base 112, the language component 110 may identify a context of the word "what" in the complete sentence of the user input 101. Specifically, the language component 110 determines the context for the user input to clarify an object type in each of the tokens in word base 112. For example, in the user input "What are the top five revenues by region?" the language component 110 tokenizes the user input and determines from the tokens the context of the sentence to be requesting for a specific value in a particular area. Therefore, the language component 110 may determine the word "what" to be a pronoun because the word "what" is asking a question about a topic.

To facilitate the accessibility of the tokens in the word base 112, the word base 112 may be searched with the token name as the index. By indexing the token and associated objects with the token name itself, the language component 110 may efficiently determine if an identified word in the user input 101 exists in the word base 112. For example, the language component 110 may index the tokens and associated objects with a hash table and hash map. In some implementations, the language component 110 may search the word base 112 for an identified token by performing word matching. The word matching may be case insensitive to broaden the possibility of matches. In other implementations, the language component 110 may perform partial word matching to verify if a token exists in the word base 112. For example, during a process of tokenization, when the language component 110 separates user input 101 into one or more tokens by a particular delimiter, such as whitespace, the language component 110 may error and accidentally split the word "revenues" into two tokens—"rev" and "enues". The language component 110 may notice an error in one or more entries in the word base 112 and combine the erred token entries should partial matches be found.

In some implementations, the dataset object library 114 may include one or more attributes and/or metrics associated with a token. However, not all tokens will have associated attributes and/or metrics. An attribute and/or metric further defines a token with an associated object. Specifically, an attribute and/or metric may describe a further distinguishing feature of an object. An attribute may be a concept reflected from a data source. For example, attributes may be stored as a flat file, a database, or an xml file in the dataset object library 114. Attributes can provide a context and analyze facts or calculations. For example, the token "region" in the user input 101 has an object of a noun, describing a part of speech of the token. In order for the language component 110 to identify a visualization type in this process, the language component 110 may require a further distinguishing characteristic of the objects. The language component 110 may define a geographic attribute associated with the object. In order to define the geographic attribute, the language component 110 may detect the geographic attribute from the client device 104. Specifically, the language component 110 may detect a latitude and longitude of the client device 104 if no latitude and longitude value is given in the user input 101. The language component 110 may detect the latitude and longitude by utilizing the client device 104's Global Positioning System (GPS). In return, the language component 110 can provide a map or grid in a particular region surrounding the detected latitude and longitude area.

In some implementations, the language component 110 may further distinguish a date and/or time associated with the region token when no time element is provided in the user input. The language component 110 can utilize an internal clock time to provide the date and/or time attribute with the region token. In other implementations, the language component 110 may utilize a clock time associated with the client device 104. In other implementations, the language component 110 may send an indication to the client device 104 to prompt user 102 with a message requesting for a date and time. In response, the user 102 may entire a date and/or time in which to view a visualization type associated with the user input 101. The language component 110 receives the user 102's input of the date and/or time, and associates the date and/or time with the object for the token "region" in the dataset object library 114.

In some implementations, a metric can provide calculations performed on data, such as that found in the word base 112, the dataset object library 114, and the visualization library 116. The language component 110 may assign a metric to further distinguish an object. For example, metrics can be information such as sales trends, growth patterns, percent-to-total contributions, profit analysis, mathematical operations, to name a few examples.

In some implementations, the visualization library 116 may include one or more visualization types and associated drop zone rules. Specifically, the visualization types may be a key performance indicator (KPI) chart, a map grid, a map bubble chart, a line chart, a heat map, a cluster bar chart, stack bar chart, a bar chart, or a combination chart including one or more of the above charts or maps. For example, the visualization library 116 may store the visualization types and associated drop zone rules in an xml file. Additionally, each of the visualizations may include one or more drop zones. A drop zone defines an area on the visualization to display data, defines the behavior of the data in the drop zone, defines one or more objects that may be included in the drop zone, and defines one or more behaviors associated with each of the data and the objects in the drop zone area. The language component 110 may retrieve a visualization type from the visualization library 116 based on priority rules. This will be further explained below.

During stage (A), a user 102 inputs a question into client device 104. The display 111 of client device 104 illustrates an example of how the client device 104 receives the user input 101. Display 111 includes a title 113 and an interactive region 115. The interactive region 115 includes a search bar and a suggestion list 117. The search bar provides the user 102 with a visual confirmation of the user input 101 into the client device 104. The client device 104 displays words from the user input 101 as the user 102 inputs the words. Additionally, the suggestion list 117 provides users with a pre-populated set of words based on the user input 101. The pre-populated set of words is retrieved from the dataset objects in the word base 112. User 102 may select one of the items from the pre-populated set of words to finish the question in the search bar or continue with entering words to create the user input 101.

During stage (B), the language component 110 obtains data that identifies a user input 101. For example, the client device 104 may send data that includes an identifier of user input 101. The data can indicate tokens from the user input 101, the user input 101 itself, a reference to the user input 101 such as a URL string, or other data that identifies the user input.

In the illustrated example, user 102 enters a user input 101 into the client device 104 for requested information. In response, the client device 104 sends data that includes an identifier for the user input 101 and credentials of user 102 to the language component 110 over network 106. The language component 110 can store the credentials of user 102 and the associated user input 101 for future retrievals where user 102 requests information with similar user inputs. By storing this information, the language component 110 may reduce processing by quickly retrieving a previously requested visualization type without performing any additional steps.

In some implementations, the language component 110 parses the user input 101 from the obtained data. For example, the language component 110 retrieves user input 101 from the transmitted data for processing and retrieves the credentials for storing. Additionally, the language component 110 compares the retrieved user input 101 with each of the stored user inputs to determine if the user input has been requested before. If the language component 110 determines the retrieved user input 101 matches one or more of the stored user inputs, the language component 110 may access the visualization type associated with the stored user input and provide the visualization type and rendering data to the client device 104.

During stage (C), the language component 110 determines no matches are found between the retrieved user input 101 and the stored user inputs. The language component 110 tokenizes the retrieved user input 101. Specifically, the language component 110 breaks the user input 101 into a predefined element, such as words, phrases, symbols, or any other meaningful element called tokens. Additionally, the language component 110 removes any sort of punctuation from the user input 101. In some implementations, during tokenization, the language component 110 may split the user input 101, which does not need to make grammatical sense, on all non-alphanumeric characters. For example, the language component 110 may tokenize the user input "Dogs, and,rocks?" into "[Dogs] [and] [rocks]". In other implementations, the language component 110 may use a predefined delimiter to split the user input 101. For example, the language component 110 may define the predefined delimiter to be whitespace, return space, or any punctuation characters.

In some implementations, the language component 110 determines a context for the user input to clarify an object type for each of the tokens. For example, the language component 110 analyzes each of the tokens from the user input 101 to determine the context. The context of the sentence may be denoted from an identified word pattern in the tokens. The language component 110 may use regular expression matching or string matching to identify the word patterns. For examples, the language component 110 may identify a word pattern, which requests for specific values in a particular region; compares objects between one another; specifies key words such as "detail", "as", and conditional terms, or requests for detailed information, to name a few examples. The context for each token may be defined once the word pattern is recognized. For example, in the tokened input "[What] [are] [the] [top] [five] [revenues] [by] [region]", the language component 110 determines a context of requesting a specific value in a particular area by identifying a word pattern such as "[What] [are]×[by] y". In another example, the language component 110 determines a context by identifying a word pattern such as "[sort] [by] x" or "x [greater] [than] y". The predefined word patterns provide an unmistakable identity to the language component 110, which allows the language component 110 to identify object types associated with the x and y placeholders from the examples. Therefore, the language component 110 may determine an object type associated with each of the tokens once the word pattern and context is known.

In some implementations, the language component 110 associates one or more objects to describe each of the tokens. Specifically, the objects identify a type of the token. For example, the language component 110 may identify objects for each of the tokens in the user input "[What] [are] [the] [top] [five] [revenues] [by] [region]". The objects may define a part of speech for each token based on the context. For example, for each of the tokens in the user input 101, the language component 110 identifies—"[What]=adjective, [are]=verb, [the]=article, [top]=adjective, [five]=adjective, [revenues]=noun, [by]=preposition, [region]=noun."

In some implementations, the language component 110 compares the identified tokens and associated objects with the stored tokens and associated objects in the word base 112. As mentioned above, the language component 110 may determine if the identified tokens exist in the word base 112. Specifically, the language component 110 can perform partial matching or whole word matching to determine if the identified tokens exist in the in word base 112. Should the language component 110 determine an identified token does not exist in the word base 112, the language component 110 may add the token and associated object to the word base 112. In some implementations, the language component 110 may determine an identified token does exist in the word base 112 but has a different stored object than an identified object. In this particular instance, the language component 110 may store a separate entry in the word base 112 of the identified token and associated object different from the stored token and the associated stored object. Additionally, the language component 110 may keep track of the tokens and stored objects in case the language component 110 has difficulty in identifying an object type for a particular token. If an error occurs in object identification, the language component 110 may traverse the word base 112 to determine if a token is currently stored which matches the identified token from the user input. Should a stored token match, the language component 110 may retrieve the associated object from the stored token for the identified token.

During stage (D), the language component 110 further identifies one or more attributes and/or metrics associated with an identified token. As mentioned above, not all tokens will have an associated attribute and/or metric. Rather, an attribute and/or metric further defines a token, where the object of the token is a noun. The tokens are given attributes and/or metrics to assist in further defining the tokens, and as a result, provide tools for determining the visualization type. Examples of attributes may include a geographic attribute, yearly attribute, monthly attribute, day and/or time attribute. Examples of metrics may include calculations of sales, revenue, inventory counts, and profits for a particular company. In some implementations, the language component 110 stores the identified tokens with the attributes and/or objects in the dataset object library 114. This allows the language component 110 to keep track of each token, object, and attribute/metric processed by system 100.

During stage (E), the language component 110 may determine a visualization type and associated drop zone rules based on priority rules. Specifically, the language component 110 can use the priority rules, which include identified word patterns from the user input, the objects associated with each token, and the attributes/metrics to identify a visualization type and associated drop rules from the visualization library 116. As mentioned above, the visualization types may include a KPI chart, a map grid, a map bubble chart, a line chart, a heat map, a cluster bar chart, a stack bar chart, a bar chart, or a combination of the above visualizations. The visualization library 116 holds the various components of the visualization types, rather than the visualization itself. For example, the visualization library 116 includes component calls for the visualization types such as the title of the visualization, x-axis values, y-axis values, color schemes, drop zone regions, graph type.

In some implementations, the language component 110 may analyze the priority rules to determine a visualization type. Specifically, the language component 110 first determines the word pattern types. For example, the language component 110 examines the user input 101 to determine if the word pattern includes the words "detail", if the word pattern includes constitutional terms, if the word pattern includes the words "compare" or "as". From a determination of the word pattern, the language component 110 then determines the attribute and/or metric type from the object type. For example, the language component 110 may determine if the object type includes 1 metric, has geography attributes, has date or time attributes, has at least one attribute and one metric, has attributes to compare, has metrics to compare, or has more than one attribute. From the identifications of the word pattern and object conditions, the language component 110 can determine a visualization type.

In some implementations, the visualization types may be determined from the identified conditions. For example, the language component 110 may determine a visualization type of KPI when the language component 110 determines the user input 101 does not include an identified word pattern, but includes at least one of the nouns with one associated metric. The language component 110 may determine a visualization type of a grid when the user input 101 includes the word "detail" in the word pattern of the user input 101. The language component 110 may determine a visualization type of a map bubble chart when the user input 101 does not include an identified word pattern, but includes at least one of the nouns with geography attributes. The language component 110 may determine a visualization type of a line chart when the user input 101 does not include an identified word pattern, but includes at least one noun with date and/or time attributes. The language component 110 may determine a visualization type of a heat map when the user input 101 includes a constitution term, such as a compositional term like "configuration" or "make up", and at least two nouns exist in the user input 101 with at least one attribute and at least metric. Additionally, the heat map may have an attribute in which the cartesian product between the set of more than one attributes is less than 50. The language component 110 may determine a visualization type of a cluster bar chart when the user input 101 includes a key word, such as "compare", and the user input 101 compares two nouns, which have attributes for objects. The language component 110 may determine a visualization type of a combination chart when the user input 101 includes a key word, such as "compare", and the user input 101 compares two nouns, which both have metrics for objects. The language component 110 may determine a visualization type of a stack bar chart when the user 101 does not include an identified word pattern, but includes more than one noun each with a particular attribute. The language component 110 may determine a visualization type of a customized chart when the user input 101 includes a key word, such as "as". In other implementations, the language component 110 may determine a visualization type of a bar chart for all other conditions. Additionally, the language component 110 may define the bar chart as the default type of visualization.

In some implementations, the language component 110 may retrieve the visualization type components from the visualization library 116. Additionally, retrieving the components for each visualization type includes retrieving drop zone rules for each of the visualization types. For example, for a map bubble chart, the language component 110 retrieves drop zone rules, which includes placing latitude, and longitude points in each geography drop zone in the visualization. Additionally, bubbles for the map bubble chart will be filled with a particular color schema and shaped with a size schema based on the data sizes. In another example, for a heat map, attributes fill in grouping areas of the heat map. The identified metrics fill in by a particular color schema and shaped with a size schema. In another example, for a cluster bar chart, the attributes fill each of the bars in the cluster bar chart. In another example, for a combination bar chart, the metrics fill each of the bars in the combination chart. In another example, for a stack bar chart, each attribute fills values for an X-axis and then a Y-axis. The identified metrics fill in each of the bars by a particular color schema and then by size. Lastly, for a customized chart, the drop zone rules conform to any of the aforementioned drop zone rules defined by the visualization type. Each of these drop zone rules associated with the visualization types define a particular visualization for the data on the display 111 of the client device 104.

During stage (F), the language component 110 transmits the identified visualization types, associated drop zone rules, the identified tokens, the objects, the attributes, and/or metrics for a particular user input, such as user input 101, to the rendering component 108. The rendering component 108 generates commands to create the visualization. Specifically, the rendering component 108 generates a command to clear the existing visualization on the display 111 of client device 104. For example, the rendering component 108 may generate a command to clear the existing visualization, any existing drop zone items, and any view filters on the display 111. Additionally, the rendering component 108 may generate a command to visually display transitional data between an existing visualization and a target visualization. For example, displayed transitional data may include a message prompt alerting user 102 that a new visualization is loading. Additionally, the transitional data may include a visualization such as a progress bar to indicate to the user 102 that a new visualization is finalizing rendering. In some implementations, the rendering component 108 can generate a command to display the target visualization generated from the language component 110. For example, the rendering component 108 may generate a command to instruct the client device 104 to render visually the visualization type with the drop zone rules and append the associated format and properties. The rendering component 108 can add any new filters and "sort by" functions for the drop zone rules in displaying the data types. Additionally, the rendering component 108 appends the user input 101 to the command in order for the display 111 to show a title as the user input 101.

In some implementations, the rendering component 108 executes each of the generated commands to generate visually rendered data. The generated visually rendered data includes three varying contents of rendered data, each associated with the particular command. For example, the first type of rendered data includes clearing the existing visualization. The second type of rendered data includes displaying transitional data between the existing visualization and the target visualization. The third type of rendered data includes displaying the target visualization. Specifically, the rendered data includes pixels associated with displaying the particular contents.

During stage (G), the rendering component 108 transmits the rendering data to the client device 104. Specifically, the client device 104 obtains the rendering data for displaying to the display 111. For example, the rendering includes instructing the client device 104 to remove any existing visualization. Removing any existing visualization includes clearing a visualization type, clearing any drop zone rules, formatting and/or properties associated with the existing visualization. Additionally, the client device 104 prepares to display the target visualization, identified by the language component 110. For example, the client device 104 obtains transitional data to display on display 111 following clearing an existing visualization. As mentioned above, the transitional data may include a progress bar to indicate to user 102 that the target visualization is in the process of being rendered by the client device 104. In another example, the transitional data may include a message to indicate a new visualization is loading. In another example, the transitional data may include a transitional visualization that includes a blurred screen indicating progress loading of a target visualization. Lastly, the client device 104 obtains the target visualization to display on display 111. For example, the client device 104 may display a grid in response to the language component 110 determining a grid is the correct visualization type for the user input 101 "What are the top five revenues by region?" Additionally, the client device 104 may display the user input 101 as the title of the grid display.

Figure 2:
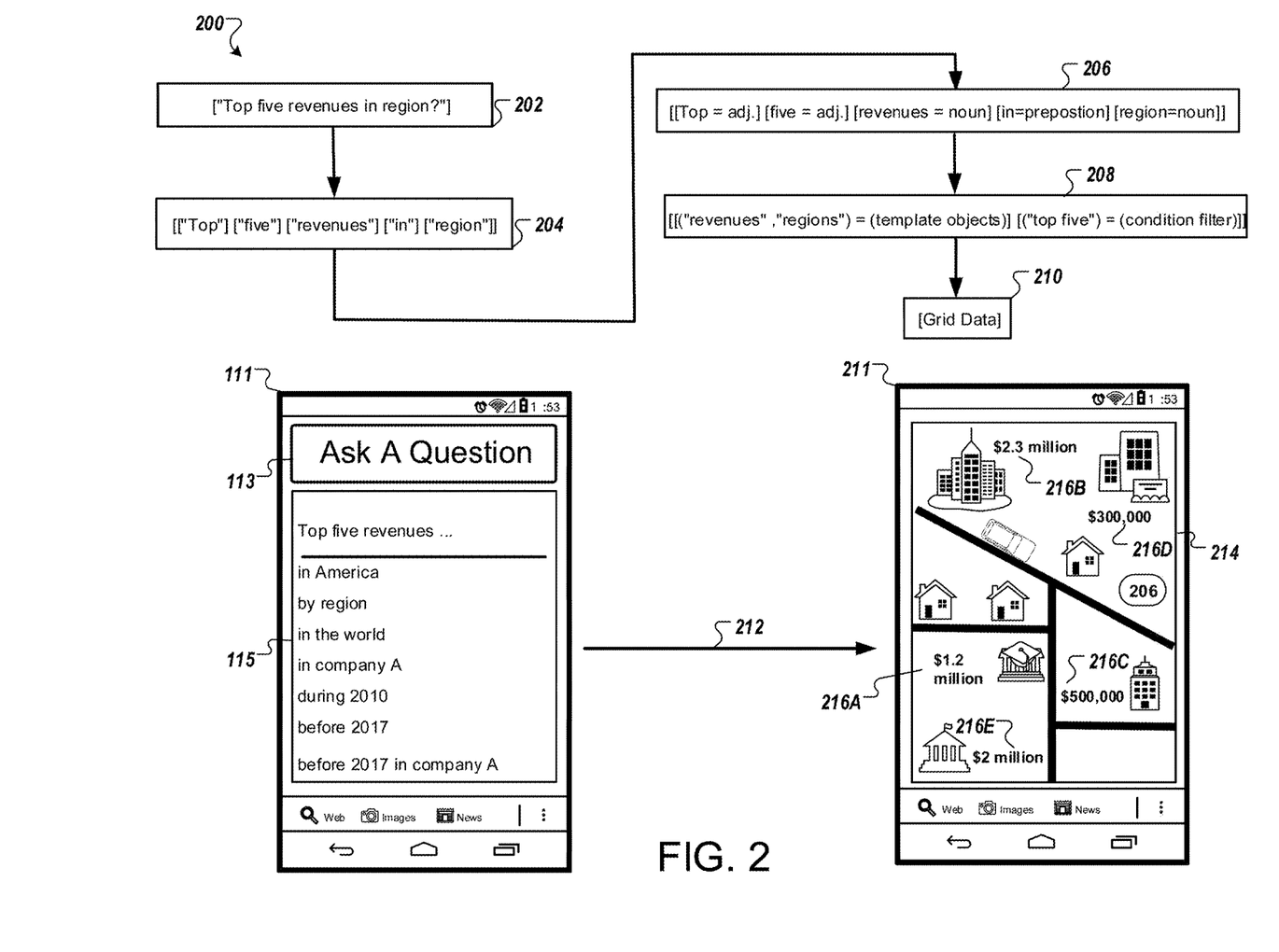
FIG. 2 is a block diagram that illustrates an example of querying using natural language visualizations.

FIG. 2 is a block diagram that illustrates an example of querying using natural language visualizations. In some implementations, FIG. 2 illustrates a visual depiction of the process illustrated by FIG. 1. Specifically, the process in FIG. 2 illustrates the functions performed by the rendering component 108, the language component 110, and the client device 104.

In some implementations, the language component 110 receives a user input 202 from a client device 104. For example, the user input 202 may be "top five revenues in region?" The language component 110 may parse the data from the client device 104 to retrieve the user input 202.

In some implementations, the language component 110 tokenizes the user input 202 into one or more tokens 204. Specifically, the tokenization separates each word by a predefined delimiter such as whitespace, return space, or any punctuation characters. Additionally, tokenizing the user input 202 allows the language component 110 to identify an object associated with each of the tokens. Otherwise, the ambiguity between words in the user input 101 may not be cured.

In some implementations, the language component 110 determines an object type associated with each of the tokens in response to identifying a word pattern and context of the user input 101. Specifically, language component 110 may use regular expression matching or string matching to determine and identify word patterns in the one or more tokens 204. The context for each token may be defined once the word pattern is recognized. Once the context is identified, such as a comparison like "x [greater] [than] y" or "[sort] [by] x", the language component 110 may identify object types for each token, as shown in identified tokens 206. As shown in the identified tokens 206, each token as an associated part of speech. For example, the language component 110 identifies the following—"[Top]=adjective, [five]=adjective, [revenues]=noun, [in]=preposition, [region]=noun."

In some implementations, the language component 110 determines one or more attributes and/or metrics associated with the tokens. The language component 110 may identify template objects, or nouns, from the identified tokens to determine which objects may receive attributes and/or metrics. For example, the language component 110 may identify attributes such as a geographic attribute, a day attribute, or a time attribute. The language component 110 may identify metrics such as calculation of sales, revenue, inventory country, and profits for a particular company, to name a few examples. Additionally, the language component 110 may determine one or more condition filters from the identified tokens 206. In this particular example, the language component 110 may identify objects 208 such as "revenues" and "regions" as template objects. Additionally, the objects 208 may include conditional objects from the user input 202, such as "top five" as condition filters.

In some implementations, the language component 110 may communicate with the visualization library 116 to determine the visualization type 210. In this particular example, the language component 110 determines the word pattern provided by user input 202 to seek a detailed answer, such as what are the top five revenues in a particular region. As a result, the language component 110 determines the resulting visualization type 210 to be a grid.

The language component 110 provides the visualization type 210 and associated components to the rendering component 108. The rendering component 108 generates multiple commands, one such command clears an existing visualization on display 111 of client device 104. A second command instructs client device 104 to display transitional data during the rendering of the target visualization, e.g., the visualization type 210. Lastly, a third command instructs client device 104 to display the target visualization type 210 on display 111. Additionally, the third command includes a title and other formatting data to display along with the target visualization type 210.

For purposes of illustration, transition 212 is utilized to show a transition between an existing visualization 111 and a target visualization 211. Specifically, display 111 illustrates an existing visualization type with the user entering in user input 202. The display 211 illustrates a target visualization type, such as grid data 210, in response to the language component 110 determining a visualization type 210 from the processes of 202 to 210.

Figure 3:
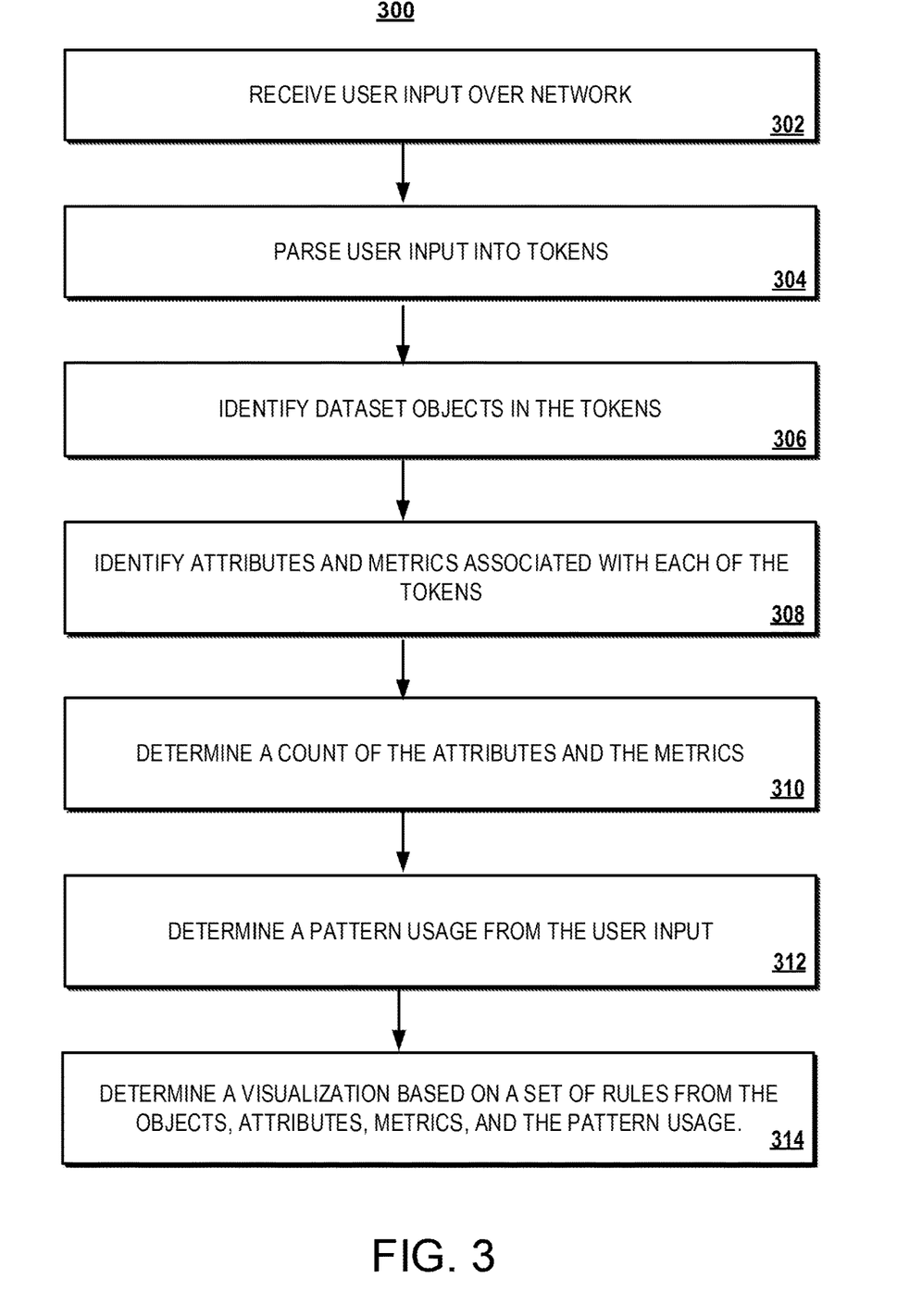
FIGS. 3 and 4 are flowcharts of example processes for providing natural language visualizations in response to a query.

FIG. 3 is a flowchart of example processes for providing natural language visualizations in response to a query. The process can be performed by one or more computers. The process 300 is described below as being performed by the language component 110 of FIG. 1, but can be performed by any appropriate computing device or combination of computing devices.

During 302, the language component 110 may receive user input over network 106. In some implementations, the language component 110 receives the user input, such as user input 101, from the client device 104. Typically, the user input 101 is a particular topic of interest for user 102. As mentioned above, the particular topic of interest may seek an answer to a particular question or a response to a particular nature of interest. For example, a user input 101 may ask a question such as "What was the revenue during year 2016?"

During 304, the language component 110 may parse the user input 101 into tokens. Specifically, the language component 110 may tokenize the user input 101 into one or more tokens based on a predefined delimiter. The predefined delimiter may be all non-alphanumeric characters, whitespace, or return space. For example, the language component 110 may tokenize the user input 101 "What was the revenue during year 2016?" into "[What] [was] [the] [revenue] [during] [year] [2016]".

During 306, the language component 110 identifies one or more objects associated with each token. In some implementations, the objects may define a part of speech for each token based on an identified context of the user input 101. For example, the language component 110 may identify objects for each of the tokens in the user input "[What] [was] [the] [revenue] [during] [year] [2016]". The language component 110 identifies—"[What]=adjective, [was]=verb, [the]=article, [revenue]=noun, [during]=preposition, [region]=noun."

During 308, the language component 110 identifies one or more attributes and/or metrics identified object associated with a token. Specifically, the language component 110 may identify one or more attributes and/or metrics to further distinguish and further define the token. For example, the language component 110 may define a token "[revenue]", which is a template object. The language component 110 may further define the token "[revenue]" with a geographic attribute such as a latitude and longitude value, like 38.907° N and 77.037° W. The geographic attribute associated with the token and the template object will be utilized later in the visualization type.

During 310, the language component 110 counts a number of attributes and metrics associated with each of the objects assigned in the user input 101. In some implementations, the number of attributes and metrics will be further utilized to determine the visualization type. For example, the number of attributes and metrics determined from each of the objects in the user input 101 can be two, a geographic attribute for the word "[revenue]" and a date attribute for the word "[2016]".

During 312, the language component 110 identifies a word pattern in the user input 101. In some implementations, the language component 110 may use regular expression matching or string matching to identify the word pattern. For example, the language component 110 may identify a word pattern, which request specific values in a particular region; compares objects between one another; specifies key words such as "detail", "as", and one or more conditional terms. The predefined word patterns provide an unmistakable identity to the language component 110, which allows the language component 110 to identify object types associated with particular placeholders.

During 314, the language component 110 determines a visualization type and associated drop zone rules based on priority rules. Specifically, the language component 110 utilizes the identified word pattern, the objects associated with each token, and the attributes/metrics associated with each of the objects to identify a visualization type. For example, based on the identified priority rules, the language component may identify a visualization type to include a KPI chart, a map grid, a map bubble chart, a line chart, a heat map, a cluster bar chart, a stack bar chart, a bar chart, or a combination of the above visualizations.

Figure 4:
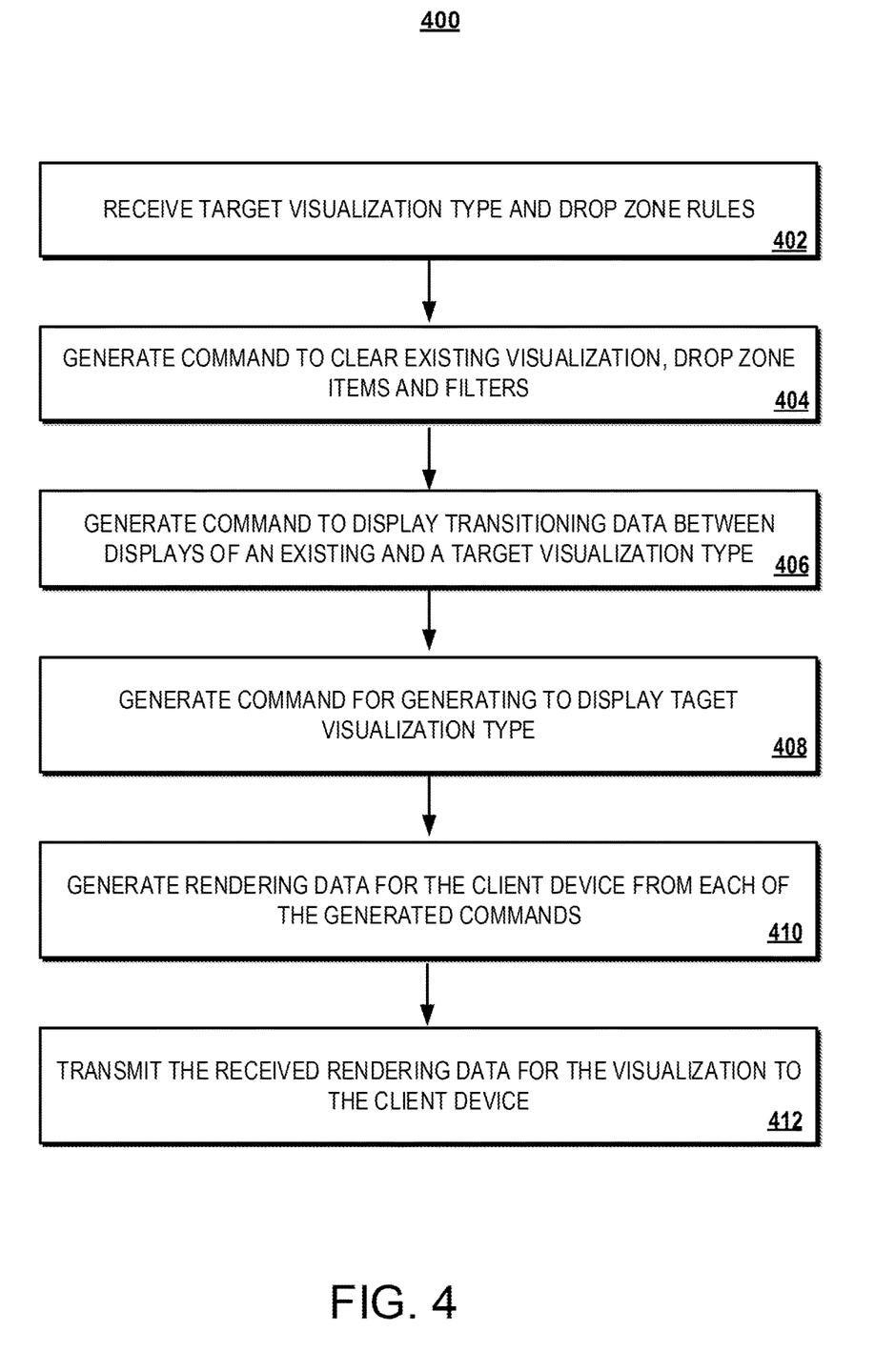

FIG. 4 is a flowchart of example processes for providing natural language visualizations in response to a query. The process can be performed by one or more computers. The process 400 is described below as being performed by the rendering component 108 of FIG. 1, but can be performed by any appropriate computing device or combination of computing devices.

During 402, the rendering component 108 receives data from the language component 110 indicating a visualization type. Specifically, the rendering component 108 receives a visualization type, associated drop zone rules, the identified tokens, the objects, the attributes, and/or metrics for a particular user input. For example, the rendering component 108 receives a visualization type of "cluster bar chart", associated drop zone rules of "attributes to put in"; the identified tokens of "[compare] [revenues] [to] [sales]"; the objects of "[compare]=verb; [revenues]=noun; [to]=preposition; [sales]=noun"; and, the attributes and/or metrics of "[revenues] and [sales]=geographic and date/time attributes or metrics.

During 404, the rendering component 108 generates a command to clear the existing visualization on display 111. Specifically, the rendering component 108 generates a command to clear the existing visualization, any existing drop zone items associated with the existing visualization, and any view filters associated with the existing visualization. For example, the command may be a string instructing the client device 104 to remove any visualizations currently displayed on display 111.

During 406, the rendering component 108 generates a command to visually display data between the transition of an existing visualization and a target visualization. For example, displayed transitional data may include a message prompt alerting user 102 that a new visualization is loading. Additionally, the transitional data may include a visualization such as a progress bar to indicate to the user 102 that a new visualization is finalizing rendering.

During 408, the rendering component 108 generates a command to visually display the target visualization type generated from the language component 110. For example, the rendering component 108 may generate a command to instruct the client device 104 to render visually the target visualization type with the drop zone rules. Additionally, the rendering component 108 may append any associated formats and target visualization properties, filters, and sort by functions. Also, the rendering component 108 appends the user input 101 to the command in order for the display 111 to show a title as the user input 101.

During 410, the rendering component 108 executes each of the generated commands to generate rendered data. In some implementations, the generated rendered data includes three varying contents of rendered data, each associated with clearing an existing visualization; displaying transitional data between the existing visualization and the target visualization; and, displaying the target visualization. Specifically, the rendered data for each of the generated commands includes pixels associated with displaying the particular contents.

During 412, the rendering component 108 transmits the generated rendered data for each of the commands to the client device 104. In some implementations, the client device 104 obtains the generated rendered data for each of the commands and displays the generated rendered data to the display 111 of client device 104.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

Figure 5:
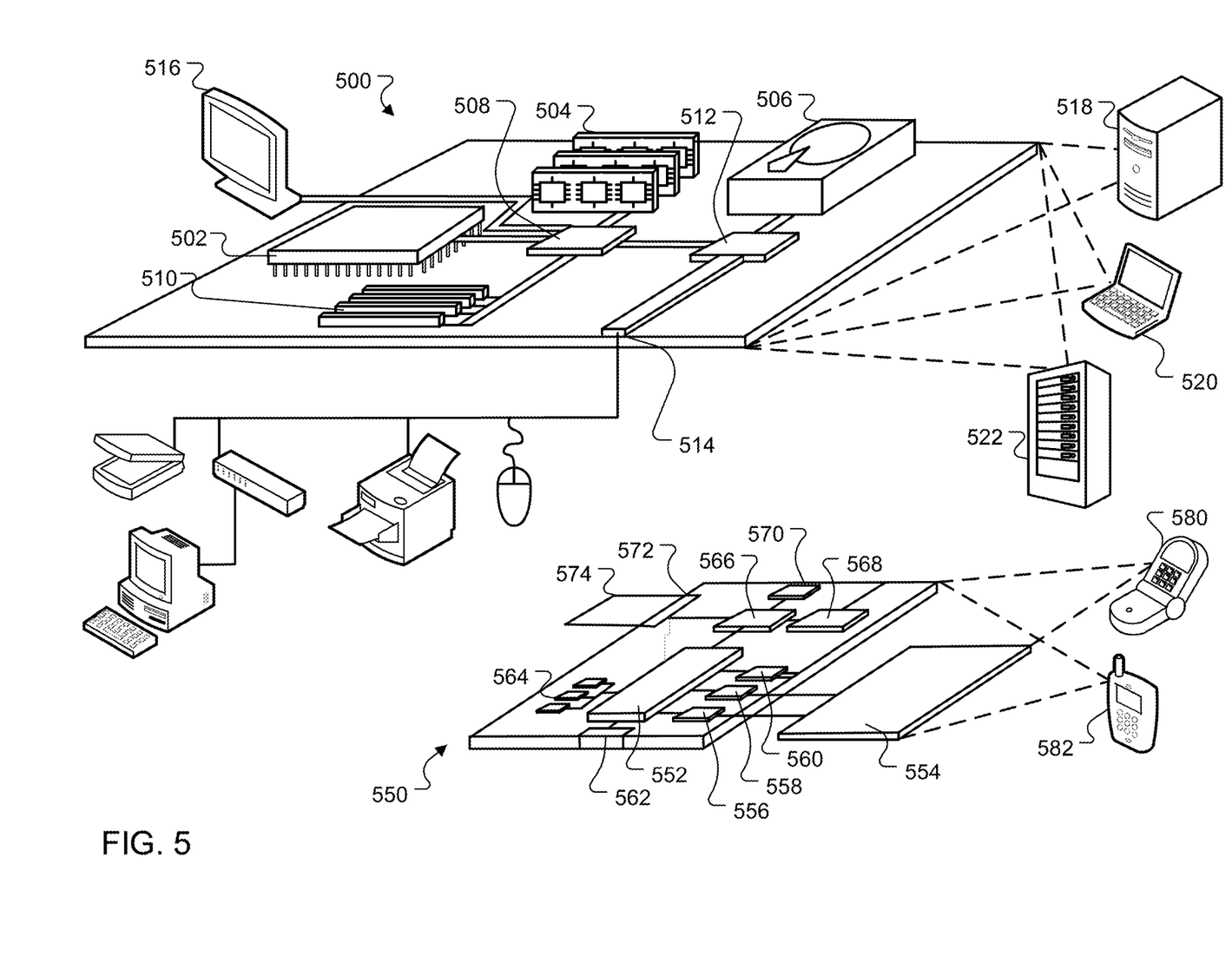
FIG. 5 shows an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 518, or multiple times in a group of such servers. In addition, it may be implemented in a personal computer such as a laptop computer 520. It may also be implemented as part of a rack server system 522. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, such that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving, by the one or more computers, data indicating a natural language query from a client device, wherein the natural language query indicates a topic of interest to a user;
   obtaining, by the one or more computers, a sequence of terms from the natural language query;
   determining, by the one or more computers, whether the sequence of terms from the natural language query matches one or more predefined word patterns, wherein each of the one or more predefined word patterns specifies a predefined sequence of multiple elements that represents multiple words;
   for each of one or more of the terms obtained from the natural language query, identifying, by the one or more computers, at least one of (i) an attribute, from a data source, that corresponds to the term or (ii) a metric corresponding to the term, wherein the metric represents a calculation involving data from a data source;
   determining, by the one or more computers, a visualization type to visualize data obtained in response to the natural language query, the visualization type being determined based on (i) one or more attributes or metrics identified as corresponding to the one or more of the terms obtained from the natural language query and (ii) determining whether the sequence matches the one or more predefined word patterns; and
   providing, by the one or more computers, visualization data based on the determined visualization type to the client device for display in response to the natural language query.

2. The method of claim 1, wherein receiving the data comprises:
   receiving, from the client device over a network, data indicating one or more terms pre-populated by the client device; and
   receiving, from the client device over the network, data indicating an identifier of the natural language query.

3. The method of claim 1, wherein obtaining the terms from the natural language query comprises parsing the natural language query; and
   wherein determining the visualization type comprises:
      comparing the parsed data to previously parsed data associated with one or more previously submitted search queries to determine whether the natural language query has been requested before;
      determining a match between the parsed data and the previously parsed data associated with a previously submitted natural language query; and
      in response to determining the match, selecting a previous visualization type corresponding to the previously submitted natural language query to provide to a rendering component.

4. The method of claim 1, wherein obtaining the terms from the natural language query comprises tokenizing the natural language query;
   wherein the method comprises:
      identifying, by the one or more computers, a word pattern that occurs in the query based on the terms obtained by tokenizing the natural language; and determining, by the one or more computers, object types represented by the terms based on the word pattern;
wherein identifying the attribute or metric for each of one or more of the terms is based on the determined object types.

5. The method of claim 1, comprising generating an indication of a part of speech for each of the terms.

6. The method of claim 1, wherein the transmitted visualization data comprises components of the determined visualization type that comprises at least one of a title of the visualization, x-axis values, y-axis values, an indication of a color scheme, one or more drop zone regions, and a graph type.

7. The method of claim 1, wherein determining the visualization type further comprises determining, by the one or more computers, one or more drop zone regions from the determined visualization type.

8. The method of claim 1, wherein the method comprises providing data to a rendering component instructing the rendering component to transmit the visualization data based on the visualization type comprising providing, over a network, data to the rendering component instructing the rendering component to generate a clear command, a transitional data command, and a target visualization type command to display on the client device.

9. The method of claim 1, wherein the one or more predefined word patterns include a particular word pattern that specifies a predefined sequence comprising (i) one or more predetermined words and (ii) one or more placeholder elements representing an occurrence of any of multiple different words or phrases.

10. The method of claim 1, wherein the one or more predefined word patterns include a particular word pattern that specifies multiple predetermined words ordered in a predetermined sequence; and
wherein determining whether the sequence of terms matches the one or more predefined word patterns comprises determining whether the sequence of terms from the natural language query includes the multiple predetermined words ordered in the predetermined sequence.

11. The method of claim 1, wherein the one or more predefined word patterns include a particular word pattern that specifies a predefined sequence including multiple placeholder elements each representing one or more words that are not specified by the particular word pattern, the predefined sequence including one or more predetermined words placed between the placeholder elements;
wherein determining whether the sequence of terms matches the one or more predefined word patterns comprises:
determining that the sequence of terms from the natural language query includes the one or more predetermined words; and
identifying, for each of the placeholder elements, at least one term in the sequence of terms from the natural language query that occurs at a same position that the placeholder element occurs with respect to the one or more predetermined words in the predefined sequence for the particular word pattern.

12. The method of claim 1, wherein determining whether the sequence of terms matches one or more predefined word patterns comprises determining that the sequence of terms matches a particular predefined word pattern;
wherein the method includes identifying a visualization type associated with the particular word pattern; and
wherein determining the visualization type comprises selecting the visualization type associated with the particular word pattern as the visualization type to visualize data obtained in response to the natural language query.

13. The method of claim 1, wherein the one or more predefined word patterns include a particular predefined word pattern specifying a particular predefined sequence that includes (i) one or more predetermined words and (ii) a placeholder element representing an occurrence of a word or phrase that is not specified by the particular word pattern, the particular predefined sequence specifying that the placeholder element occurs at a predefined position with respect to the one or more predetermined words;
wherein determining whether the sequence of terms matches one or more predefined word patterns comprises determining that the sequence of terms from the natural language query matches the particular predefined word pattern; and
wherein the method includes:
identifying a term occurring in the sequence of terms at the predefined position with respect to the one or more predetermined words that the placeholder element occurs with respect to the one or more predetermined words in the particular predefined sequence; and
determining a context for the identified term in the sequence of terms based on determining that the sequence of terms from the natural language query matches the particular predefined word pattern.

14. A system comprising:
one or more computers; and
one or more computer-readable media storing instructions that, when executed by the one or more computers, cause the one or more computers to perform operations comprising:
receiving, by the one or more computers, data indicating a natural language query from a client device, wherein the natural language query indicates a topic of interest to a user;
obtaining, by the one or more computers, a sequence of terms from the natural language query;
determining, by the one or more computers, whether the sequence of terms from the natural language query matches one or more predefined word patterns, wherein each of the one or more predefined word patterns specifies a predefined sequence of multiple elements that represents multiple words;
for each of one or more of the terms obtained from the natural language query, identifying, by the one or more computers, at least one of (i) an attribute, from a data source, that corresponds to the term or (ii) a metric corresponding to the term wherein the metric represents a calculation involving data from a data source;
determining, by the one or more computers, a visualization type to visualize data obtained in response to the natural language query, the visualization type being determined based on one or more attributes or metrics identified as corresponding to the one or more of the terms obtained from the natural language query and (ii) determining whether the sequence matches the one or more predefined word patterns; and providing, by the one or more computers, visualization data based on the determined visualization type to the client device for display in response to the natural language query.

15. The system of claim 14, wherein receiving the data comprises:

receiving, from the client device over a network, data indicating one or more terms pre-populated by the client device; and receiving, from the client device over the network, data indicating an identifier of the natural language query.

16. The system of claim 14, wherein obtaining the terms from the natural language query comprises parsing the natural language query; and wherein determining the visualization type comprises:

comparing the parsed data to previously parsed data associated with one or more previously submitted search queries to determine whether the natural language query has been requested before;

determining a match between the parsed data and the previously parsed data associated with a previously submitted natural language query; and in response to determining the match, selecting a previous visualization type corresponding to the previously submitted natural language query to provide to a rendering component.

17. The system of claim 14, wherein the transmitted visualization data comprises components of the determined visualization type that comprises at least one of a title of the visualization, x-axis values, y-axis values, an indication of a color scheme, one or more drop zone regions, and a graph type.

18. One or more non-transitory computer-readable media storing instructions that, when executed by the one or more computers, cause the one or more computers to perform operations comprising:

receiving, by the one or more computers, data indicating a natural language query from a client device, wherein the natural language query indicates a topic of interest to a user;

obtaining, by the one or more computers, a sequence of terms from the natural language query;

determining, by the one or more computers, whether the sequence of terms from the natural language query matches one or more predefined word patterns, wherein each of the one or more predefined word patterns specifies a predefined sequence of multiple elements that represents multiple words;

for each of one or more of the terms obtained from the natural language query, identifying, by the one or more computers, at least one of (i) an attribute, from a data source, that corresponds to the term or (ii) a metric corresponding to the term wherein the metric represents a calculation involving data from a data source;

determining, by the one or more computers, a visualization type to visualize data obtained in response to the natural language query, the visualization type being determined based on (i) one or more attributes or metrics identified as corresponding to the one or more of the terms obtained from the natural language query and (ii) determining whether the sequence matches the one or more predefined word patterns; and providing, by the one or more computers, visualization data based on the determined visualization type to the client device for display in response to the natural language query.

19. The one or more non-transitory computer-readable media of claim 18, wherein receiving the data comprises:

receiving, from the client device over a network, data indicating one or more terms pre-populated by the client device; and receiving, from the client device over the network, data indicating an identifier of the natural language query.

\* \* \* \* \*

UNITED STATES PATENT AND TRADEMARK OFFICE
CERTIFICATE OF CORRECTION

| | |
|---|---|
| PATENT NO. | : 10,846,318 B1 |
| APPLICATION NO. | : 15/955541 |
| DATED | : November 24, 2020 |
| INVENTOR(S) | : Chris McNabney et al. |

It is certified that error appears in the above-identified patent and that said Letters Patent is hereby corrected as shown below:

In the Claims

In Claim 14, Column 22, Line 62, after "on" insert -- (i) --.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*